(12) United States Patent
Igari et al.

(10) Patent No.: US 10,113,713 B2
(45) Date of Patent: Oct. 30, 2018

(54) LIGHT IRRADIATION APPARATUS AND OPTICAL FIBER PATH USED IN THE LIGHT IRRADIATION APPARATUS

(71) Applicants: NATIONAL INSTITUTE OF ADVANCED INDUSTRIAL SCIENCE AND TECHNOLOGY, Tokyo (JP); YAMASHITA DENSO CORPORATION, Hachioji-shi, Tokyo (JP)

(72) Inventors: Sanekazu Igari, Tsukuba (JP); Nobuhiko Kubo, Hachioji (JP)

(73) Assignees: NATIONAL INSTITUTE OF ADVANCED INDUSTRIAL SCIENCE AND TECHNOLOGY, Tokyo (JP); YAMASHITA DENSO CORPORATION, Tokyo (JP)

( * ) Notice: Subject to any disclaimer, the term of this patent is extended or adjusted under 35 U.S.C. 154(b) by 0 days.

(21) Appl. No.: 15/597,656

(22) Filed: May 17, 2017

(65) Prior Publication Data

US 2017/0363271 A1 Dec. 21, 2017

(30) Foreign Application Priority Data

Jun. 15, 2016 (JP) .................................. 2016-118456

(51) Int. Cl.
*F21S 8/00* (2006.01)
*F21V 14/00* (2018.01)
(Continued)

(52) U.S. Cl.
CPC .......... *F21V 14/003* (2013.01); *F21V 14/006* (2013.01); *H05B 33/0845* (2013.01); *H05B 33/0857* (2013.01); *H05B 41/40* (2013.01)

(58) Field of Classification Search
CPC .... A61B 1/07; A61B 1/0684; G02B 23/2469; G02B 6/0006; G02B 6/0008; G02B 6/04;
(Continued)

(56) References Cited

U.S. PATENT DOCUMENTS 5,031,078 A * 7/1991 Bornhorst ................ G02B 6/00
362/552
8,125,426 B2 2/2012 Nagase et al.
(Continued)

FOREIGN PATENT DOCUMENTS

JP 2571631 Y2 5/1998
JP 2000-133029 A 5/2000
(Continued)

*Primary Examiner* — Thien M Le
(74) *Attorney, Agent, or Firm* — Westerman, Hattori, Daniels & Adrian, LLP

(57) ABSTRACT

A light irradiation apparatus includes a plurality of light sources, a plurality of light transmission paths capable of selectively transmitting lights from the plurality of light sources, respectively, and an optical fiber path provided with a plurality of light incidence ends receiving respective lights from the plurality of light transmission paths, and a single light exit end. The optical fiber path has a plurality of optical fiber bundles. Incidence ends of the plurality of optical fiber bundles configures the plurality of light incidence ends, and exit ends of the plurality of optical fiber bundles configure the single light exit end by combining themselves. A lot of optical fibers constitute the plurality of optical fiber bundles. The optical fibers of the plurality of optical fiber bundles are dispersedly arranged with each other in uniform at the single light exit end.

13 Claims, 10 Drawing Sheets

(51) Int. Cl.
*H05B 33/08* (2006.01)
*H05B 41/40* (2006.01)

(58) Field of Classification Search
CPC .. G02B 6/241; G02B 6/40; F21K 9/00; F21K 9/61; F21V 5/007; F21V 5/048
USPC .......................................................... 362/277
See application file for complete search history.

(56) References Cited

U.S. PATENT DOCUMENTS

| | | | |
|---|---|---|---|
| 2003/0042493 A1* | 3/2003 | Kazakevich ......... | A61B 1/0607 257/98 |
| 2007/0052636 A1* | 3/2007 | Kalt ..................... | G09G 3/34 345/83 |
| 2008/0310181 A1* | 12/2008 | Gurevich .............. | G02B 6/0006 362/554 |
| 2009/0224694 A1* | 9/2009 | Horing .................. | G02B 21/06 315/295 |
| 2011/0103757 A1* | 5/2011 | Alkemper ............ | C03B 37/01211 385/124 |
| 2011/0257483 A1* | 10/2011 | Mizuyoshi ............ | A61B 1/0684 600/178 |
| 2014/0140087 A1* | 5/2014 | Scholtz ................. | G02B 6/32 362/554 |
| 2014/0193153 A1* | 7/2014 | Hosoda ................. | H04J 14/00 398/79 |

FOREIGN PATENT DOCUMENTS

| | | |
|---|---|---|
| JP | 4406140 B2 | 1/2010 |
| WO | 2013/136867 A1 | 9/2013 |

\* cited by examiner

LIGHT IRRADIATION APPARATUS AND OPTICAL FIBER PATH USED IN THE LIGHT IRRADIATION APPARATUS

BACKGROUND OF THE INVENTION

Field of the Invention

The present invention relates to a light irradiation apparatus capable of variably controlling intensity and spectral distribution of the light irradiated, and to an optical fiber path used in the light irradiation apparatus.

Background Art

In case of reducing step-by-step the intensity of irradiating light in a light irradiation apparatus provided with a gas discharge lamp such as a xenon lamp as a source of light, the lamp current supplied to this gas discharge lamp has been generally reduced. However, such light intensity reduction due to the control of the light current has been limited to reduce the irradiated light intensity equal to or larger than half of the maximum intensity. In order to reduce the irradiated light intensity less than half, it is necessary to insert an additional mechanical dimming means such as a mesh filter or a punching board into the optical path.

With respect to such mechanical dimming means, Patent Document 1 discloses a dimming board having a plurality of through-holes to be inserted between a light source and an optical fiber bundle so as to dim the light from the light source to the optical fiber bundle. Also, Patent Document 2 discloses insertion of a punching dimming filter having a light shielding plate with a plurality of through-holes into an optical path to dim by blocking a part of light beam from a light source.

Patent Document 1: Patent Publication No. 4406140
Patent Document 2: WIPO Publication No. 2013/136867

Usage of such mechanical dimming means can reduce greatly the intensity of the irradiated light from the light source. However, this mechanical dimming means essentially has problems of not only changing a spectral distribution of light passing there through but also deteriorating a uniformity of in-plane light intensity distribution.

Particularly, there are serious problems in dimming of the light irradiated from the gas discharge lamp by changing the lamp current. That is, first, a spectral distribution of the light emitted from the discharge lamp will greatly change by changing the lamp current, and second, since it is necessary to wait for around ten minutes until the lamp voltage or the light flux become stable after the lamp current change, it is not possible to utilize the dimmed light just after the light-quantity adjustment.

SUMMARY OF THE INVENTION

It is therefore an object of the present invention to provide a new light irradiation apparatus capable of resolving the prior art problems, and an optical fiber path used in the light irradiation apparatus.

That is, an object of the present invention is to provide a light irradiation apparatus and an optical fiber path used in the light irradiation apparatus, whereby a large degree or rate of adjustment of light-quantity can be expected.

Another object of the present invention is to provide a light irradiation apparatus and an optical fiber path used in the light irradiation apparatus, whereby a light-quantity adjustment can be performed with no change in the spectral distribution of the light.

Further object of the present invention is to provide a light irradiation apparatus and an optical fiber path used in the light irradiation apparatus, whereby it is possible to utilize the dimmed light just after the light-quantity adjustment.

Still further object of the present invention is to provide a light irradiation apparatus and an optical fiber path used in the light irradiation apparatus, whereby a uniformity of in-plane light intensity distribution can be obtained even during the light-quantity adjustment.

Further object of the present invention is to provide a light irradiation apparatus and an optical fiber path used in the light irradiation apparatus, whereby a uniformity of an in-plane light spectral distribution can be obtained even if the spectral distribution is adjusted.

According to the present invention, a light irradiation apparatus includes a plurality of light sources, a plurality of light transmission paths capable of selectively transmitting lights from the plurality of light sources, respectively, and an optical fiber path provided with a plurality of light incidence ends receiving respective lights from the plurality of light transmission paths, and a single light exit end. The optical fiber path has a plurality of optical fiber bundles. Incidence ends of the plurality of optical fiber bundles configures the plurality of light incidence ends, and exit ends of the plurality of optical fiber bundles configure the single light exit end by combining themselves. A lot of optical fibers constitute the plurality of optical fiber bundles. The optical fibers of the plurality of optical fiber bundles are dispersedly arranged with each other in uniform at the single light exit end.

The light from a plurality of light sources are transmitted selectively through light transmission paths and are incident on a plurality of light incidence ends of an optical fiber path, and then the lights pass through a plurality of optical fiber bundles, respectively, and exit from a single light exit end that is formed by combining the plurality of optical fiber bundles together. Thus, if the lights from the light sources are appropriately and selectively combined in the light transmission paths, it is possible to adjust light-quantity step-by step, and also it is possible to adjust the light-quantity to a large extent. Further, since the light-quantity is adjusted without using a mechanical light-quantity adjustment means, the light-quantity adjustment can be performed with no change in the spectral distribution of the light. Furthermore, since the light-quantity is adjusted by adequately selecting lights from the plurality of light sources, not by changing the lamp current, it is possible to utilize light just after the light-quantity is adjusted even if each light source consists of a gas discharge lamp.

Particularly, according to the present invention, since a lot of optical fibers constitute the plurality of optical fiber bundles and the optical fibers of the plurality of optical fiber bundles are dispersedly arranged with each other in uniform at the single light exit end, the lights that are incident on each of a plurality of optical fiber bundles are emitted in uniform distribution, and uniformity of the light intensity distribution can be well maintained even during the light intensity adjustment. More particularly, according to the present invention, since a lot of optical fibers constitute the plurality of optical fiber bundles and the optical fibers of the plurality of optical fiber bundles are dispersedly arranged with each other in uniform at the single light exit end, a uniformity of an in-plane light spectral distribution can be obtained even if the spectral distribution is adjusted by applying lights with different wavelength ranges with each other to the plurality of light incidence ends of the optical fiber path.

It is preferred that the optical fibers are radially arranged for each of the plurality of optical fiber bundles at the single light exit end so that the optical fibers are dispersedly arranged in uniform, or that the optical fibers are vorticosely arranged for each of the plurality of optical fiber bundles at the single light exit end so that the optical fibers are dispersedly arranged in uniform.

It is also preferred that the apparatus further includes a first optical element for concentrating light from the optical fiber path, an integrator element for distributing the light from the first optical element optically in uniform, and a second optical element for converting the light from the integrator element into parallel light. Since the light from the light exit end of the optical fiber path is concentrated at the first optical element and the concentrated light is incident on the integrator element to distribute optically in uniform, and thereafter the uniform light is converted into parallel light at the second optical element, it is possible to obtain a parallel light beam with a uniform light intensity.

It is further preferred that the apparatus further includes a dimming means capable of dimming lights that are incident on the plurality of light incidence ends, respectively.

In this case, it is more preferred that each of the dimming means has a translation mechanism for mechanically displacing, along an optical axis in parallel, a third optical element for concentrating parallel light from the light source to be incident on the light incidence end of the optical fiber path, or that each of the dimming means has a translation mechanism for mechanically displacing the light incidence end of the optical fiber path along an optical axis in parallel, a concentrated light of parallel light from the light source or a concentrated light from the light source being incident on the light incidence end of the optical fiber path.

It is still further preferred that each of the plurality of light transmission paths comprises a shutter means capable of selectively blocking light transmitted through the light transmission path.

In this case, it is more preferred that the apparatus further includes a control means for controlling intensity of lights emitted from the plurality of light transmission paths by controlling shuttering operation of a plurality of the shutter means in the plurality of light transmission paths, respectively.

It is further preferred that each of the plurality of light transmission paths includes a spectral distribution defining means for defining spectral distribution of light transmitted through the light transmission path.

In this case, it is more preferred that the spectral distribution defining means consists of an optical filter element.

It is also preferred that the plurality of light sources are configured by a plurality of gas discharge lamps, respectively.

It is further preferred that the plurality of light sources are configured by a plurality of solid light-emitting elements, respectively. In this case, since the temperature of the light sources does not become high, the optical fiber can be formed from general glass fiber without using expensive quartz glass fiber, so as to provide a cheap light irradiation apparatus. Furthermore, since irradiation start and stop can be instantly controlled by ON/OFF of current supplied to the solid light-emitting elements, the light transmitted can be selectively blocked without using shutter means. As a result, configuration of the light irradiation apparatus can be simplified, and the manufacturing cost can be reduced.

In this case, it is more preferred that current provided to each of the plurality of solid light-emitting elements is adjusted so as to control intensity of light that is incident on each of the plurality of light incidence ends of the optical fiber path. Since dimming of light up to the stable full condition can be performed instantly by adjusting current supplied to the solid light-emitting elements without changing spectral distribution of light.

It is further preferred that the plurality of solid light-emitting elements include different colored solid light-emitting elements for emitting different color lights having different spectral distributions with each other, and that spectral distribution of light emitted from the optical fiber path is controlled by selectively entering light emitted from one of the different colored solid light-emitting elements onto the plurality of light incidence ends of the optical fiber path. Since the solid light-emitting elements are small in size, it is possible to mount a plurality of the solid light-emitting elements emitting different color lights having different spectral distributions with each other on the same apparatus. Thus, a light with a desired spectral distribution can be provided by selectively emitting light from one of the solid light-emitting elements emitting different color lights with each other. Further, lights with various spectral distributions can be provided by emitting lights from selectively combined different color solid light-emitting elements.

It is still further preferred that the plurality of solid light-emitting elements include different colored solid light-emitting elements for emitting different color lights having different spectral distributions with each other, and that spectral distribution of light emitted from the optical fiber path is controlled by emitting lights from selectively combined different colored solid light-emitting elements.

According to the present invention, also, an optical fiber path used in a light irradiation apparatus includes a plurality of optical fiber bundles having a plurality of incidence ports that configure a plurality of light incidence ends, respectively. The plurality of optical fiber bundles configure a single light exit end by combining themselves at exit ports. A lot of optical fibers constitute the plurality of optical fiber bundles. The optical fibers of the plurality of optical fiber bundles are dispersedly arranged with each other in uniform at the single light exit end.

Thus, a uniformity of the light intensity distribution can be well maintained even during the light-quantity adjustment. Also, a uniformity of an in-plane light spectral distribution can be obtained even if the spectral distribution is adjusted by applying lights with different wavelength ranges with each other to the plurality of light incidence ends of the optical fiber path.

It is preferred that the lot of optical fibers are radially arranged for each of the plurality of optical fiber bundles at the single light exit end so that the optical fibers are dispersedly arranged in uniform, or that vorticosely arranged for each of the plurality of optical fiber bundles at the single light exit end so that the optical fibers are dispersedly arranged in uniform.

Advantages of the Invention

According to the present invention,
(1) Since the light from a plurality of light sources are transmitted selectively through light transmission paths and are incident on a plurality of light incidence ends of an optical fiber path, and then the lights pass through a plurality of optical fiber bundles, respectively, and exit from a single light exit end that is formed by combining the plurality of optical fiber bundles together, if the lights from the light sources are appropriately and selectively combined in the light transmission paths, it is possible to adjust light-quantity step-by step, and also it is possible to adjust the light-quantity to a large extent.

(2) Because the light-quantity is adjusted without using a mechanical light-quantity adjustment means, the light-quantity adjustment can be performed with no change in the spectral distribution of the light.

(3) Because the light-quantity is adjusted by appropriately selecting lights from the plurality of light sources, not by changing the lamp current, it is possible to utilize light just after the light-quantity is adjusted even if each light source consists of a gas discharge lamp.

(4) Since a lot of optical fibers constitute the plurality of optical fiber bundles and the optical fibers of the plurality of optical fiber bundles are dispersedly arranged with each other in uniform at the single light exit end, the lights that are incident on each of a plurality of optical fiber bundles are emitted in uniform distribution, and uniformity of the light intensity distribution can be well maintained even during the light-quantity adjustment.

(5) Since the light from the light exit end of the optical fiber path is concentrated at the first optical element and the concentrated light is incident on the integrator element to distribute optically in uniform, and thereafter the uniform light is converted into parallel light at the second optical element, it is possible to obtain a parallel light beam with a uniform light intensity.

(6) Because a lot of optical fibers constitute the plurality of optical fiber bundles and the optical fibers of the plurality of optical fiber bundles are dispersedly arranged with each other in uniform at the single light exit end, a uniformity of an in-plane light spectral distribution can be obtained even if the spectral distribution is adjusted by applying lights with different wavelength ranges with each other to the plurality of light incidence ends of the optical fiber path.

(7) In case that the light sources are constituted by solid light-emitting elements such as LEDs (Light Emitting Diodes) for example, the temperature of the light sources does not become high. So, the optical fiber can be formed from general glass fiber without using expensive quartz glass fiber, so as to provide a cheap light irradiation apparatus.

(8) Also, in case that the light sources are constituted by solid light-emitting elements such as LEDs, since irradiation start and stop can be instantly controlled by ON/OFF of current supplied to the solid light-emitting elements, the light transmitted can be selectively blocked without using shutter means. As a result, configuration of the light irradiation apparatus can be simplified, and the manufacturing cost can be reduced.

(9) Further, in case that the light sources are constituted by solid light-emitting elements such as LEDs, since dimming of light up to the stable full condition can be performed instantly by adjusting current supplied to the solid light-emitting elements without changing spectral distribution of light.

(10) Since the solid light-emitting elements are small in size, it is possible to mount a plurality of the solid light-emitting elements emitting different color lights having different spectral distributions with each other on the same apparatus. Thus, a light with a desired spectral distribution can be provided by selectively emitting light from one of the solid light-emitting elements emitting different color lights with each other. Further, lights with various spectral distributions can be provided by emitting lights from selectively combined different color solid light-emitting elements.

Further objects and advantages of the present invention will be apparent from the following description of the preferred embodiments of the invention as illustrated in the accompanying drawings.

DESCRIPTION OF THE PREFERRED EMBODIMENTS

Figure 1:
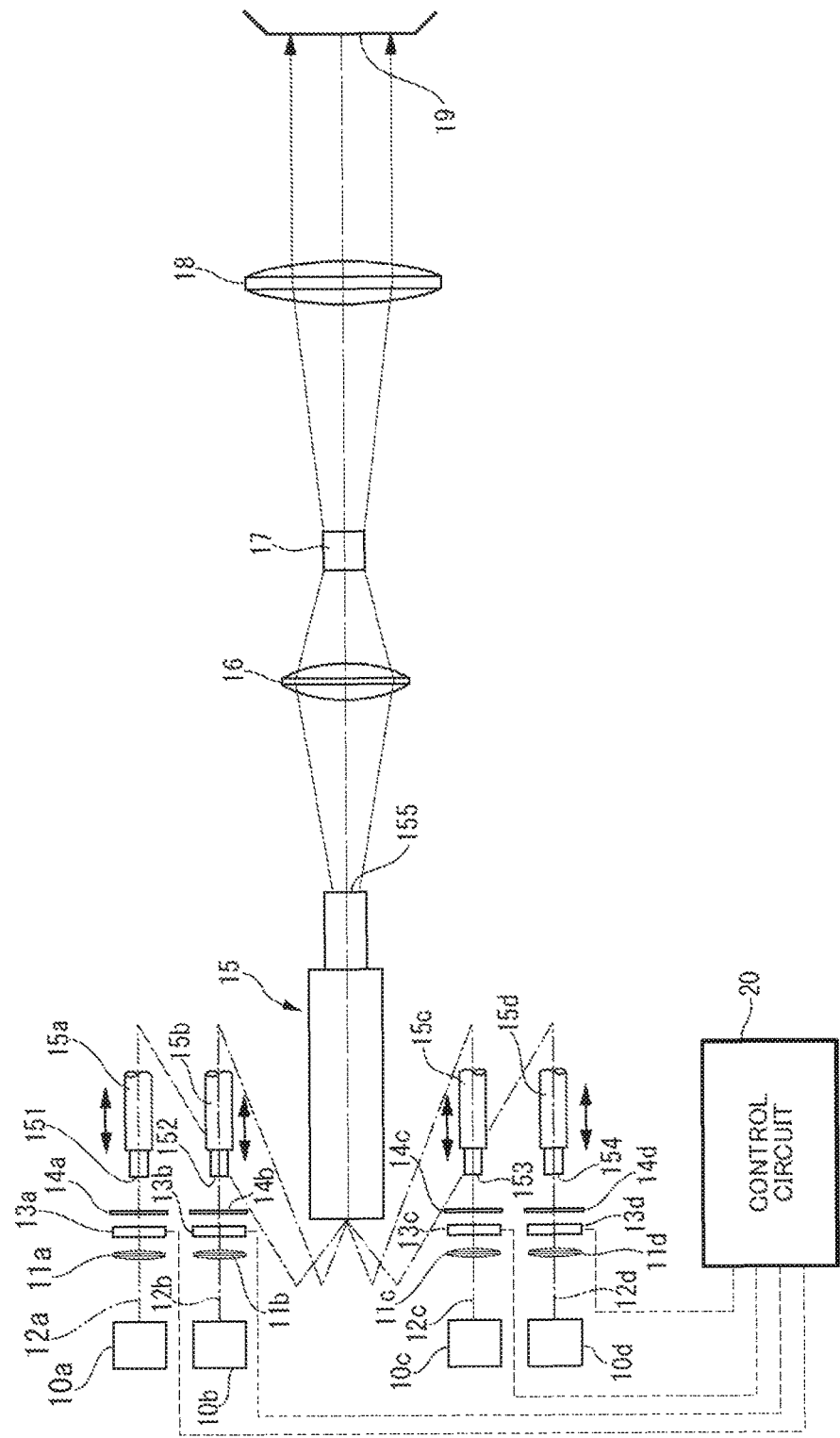
FIG. 1 is a view schematically illustrating whole constitution in an embodiment of a light irradiation apparatus according to the present invention.

FIG. 1 schematically illustrates whole constitution in an embodiment of a light irradiation apparatus according to the present invention. This embodiment adopts a four-branched optical fiber path (four branching) where light incidence ends of four optical fiber bundles are formed at one end, and a single light exit end is formed at the other end. In case that a multi-branched optical fiber path where light incidence ends of multi optical fiber bundles (the number of bundles being different from four) are formed at one end and a single light exit end is formed at the other end is to be formed, the similar constitution as will be described hereinafter may be adopted.

In FIG. 1, reference numerals 10a-10d denote four light sources independent with each other, 11a-11d four convex lens elements for concentrating parallel lights exited from the light sources 10a-10d along optical axes 12a-12d, respectively, 13a-13d four shutter mechanisms (corresponding to shutter means of the present invention) for passing or blocking the light from the convex lens elements 11a-11d, respectively, by opening and closing, 14a-14d four wavelength-selection filters (corresponding to spectral distribution defining means of the present invention) for defining spectral distribution of lights transmitted through the shutter mechanism 13a-13d, respectively, 15 an optical fiber path having four light incidence ends 151-154 receiving respective lights passed through the wavelength-selection filters 14a-14d and a single light exit end 155, 16 a convex lens element (corresponding to first optical element of the present invention) for concentrating the light from this optical fiber path 15, 17 an integrator element for distributing the light from the convex lens element 16 optically in uniform, 18 a collimation lens element (corresponding to second optical element of the present invention) for converting the light from the integrator element 17 into parallel light, 19 a light irradiation surface onto which the light from collimation lens element 18 is irradiated, and 20 a control circuit (corresponding to control means of the present invention) capable of individually controlling opening and closing operation of the shutter mechanisms 13a-13d.

In this embodiment, the four convex lens elements 11a-11d, the four shutter mechanisms 13a-13d, and the four wavelength-selection filters 14a-14d constitute the plurality of light transmission paths according to the present invention.

The optical fiber path 15 has four optical fiber bundles 15a-15d. These four optical fiber bundles 15a-15d configure the four light incidence ends 151-154, respectively, at the incidence ends, and configure the single light exit end 155 at the exit ends by combining the optical fiber bundles. A lot of optical fibers constitute the four optical fiber bundles 15a-15d. The optical fibers of these four optical fiber bundles 15a-15d are dispersedly arranged with each other in uniform at the single light exit end 155.

In this embodiment, translation mechanisms (not shown) for mechanically displacing the four light incidence ends 151-154 of the four optical fiber bundles 15a-15d along the optical axes in parallel, respectively, are provided. These translation mechanisms constitute dimming mechanisms (corresponding to dimming means of the present invention) for adjusting the light-quantity of lights, namely for dimming lights, that are incident on the four light incidence ends 151-154, respectively.

Figure 2:
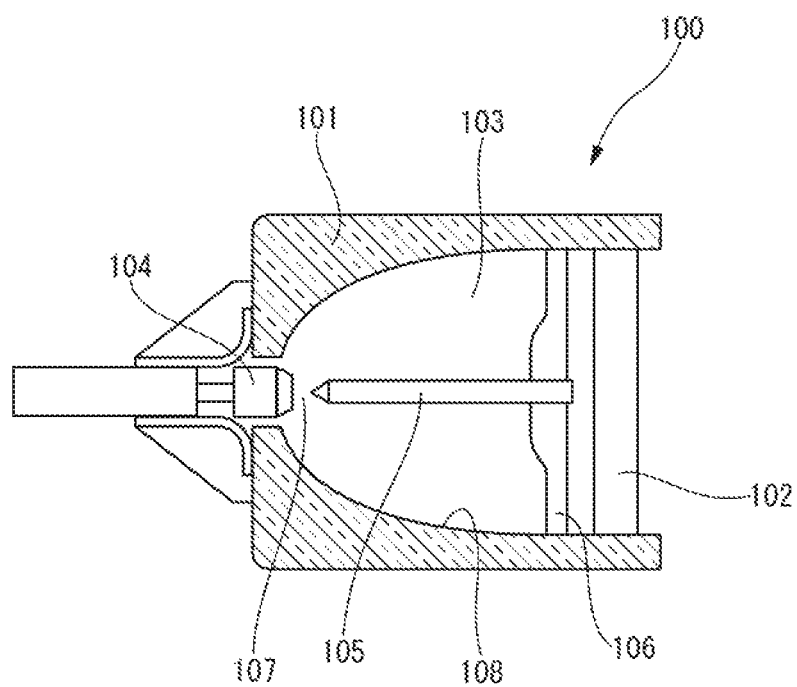
FIG. 2 is a sectional view schematically illustrating a structure of a light source in the light irradiation apparatus shown in FIG. 1.

FIG. 2 schematically illustrates a structure of an example of each of the light sources 10a-10d in the light irradiation apparatus of this embodiment.

As shown in the figure, each light source of this embodiment is configured from an integral lamp unit 100 manufactured as one body. The lamp unit 100 has a reflecting mirror member 101 made of a ceramic material, a transparent window member 102 formed in front of the reflecting mirror member 101 and made of a sapphire material for example, and a lamp chamber 103 surrounded by the reflecting mirror member 101 and the transparent window member 102 and hermetically sealed. In the lamp chamber 103, a high pressure xenon gas of several standard atmosphere is enclosed. The lamp unit 100 also has an anode 104 made of a tungsten material and provided with a leading end located in the lamp chamber 103, a cathode 105 provided with a sharp leading end and opposed to the leading end of the anode 104, and a cathode support member 106 for immovably supporting the cathode 105.

The anode 104 and the cathode 105 are arranged so that the leading ends thereof are opposed to each other with a short gap there between on the optical axis, and are integrally fixed to the reflecting mirror member 101. A voltage is applied between the anode 104 and the cathode 105 to generate a xenon short arc that is called as a light emission point 107.

An inner surface of the reflecting mirror member 101 configures a reflecting mirror 108 with a parabolic axial section. At the focus of this reflecting mirror 108, the light emission point 107 of the short arc is located. According to this lamp unit 100, since the positional relationship between the light emission point 107 and the reflecting mirror 108 is fixed, no shaft-arraignment work of the light emission point 107 is necessary. Also, since the light emission point 107 is located at the parabolic focus of the reflecting mirror 108, the light reflected by the reflecting mirror 108 and emitted therefrom becomes a parallel light along the optical axis.

It is noted that such lamp unit 100 is commercially available from EXCELITAS TECHNOLOGIES CORPORATION as a CERMAX (Registered Trademark) lamp.

Each of the four shutter mechanisms 13a-13d in the light transmission path is a mechanical shutter, constituted from combination of an actuator and a shutter plate, for passing or blocking the light transmitting through the light transmission path, in response to an opening and closing signal from the control circuit 20. The actuator may be configured by a stepper motor or a rotary solenoid depending upon the required opening and closing speed. As for the stepper motor, for example, PK566NAW (Driver: CRD5114P) manufactured by ORIENTAL MOTOR CO., LTD. is applicable, and as for the rotary solenoid, for example, 3T-4-04-DC24 or 5T-4-04-DC24 manufactured by NAOGATAKIKO CO., LTD. is applicable. The shutter plate may be configured by a plate such as for example an aluminum plate, which moves across the optical axis by the operation of such actuator so as to open and close the optical path.

The four wavelength-selection filters 14a-14d of the light transmission path are optical filter elements formed to pass lights with wavelength bands different from each other, respectively, and are configured by multilayered-film filters made of a quartz glass material for example. It is not necessary that all of the wavelength-selection filters 14a-14d have to pass the lights with different wavelength bands to each other, but a part of the wavelength-selection filters 14a-14d may pass lights with the same wavelength bands. In case that the respective pass wavelength bands of the four wavelength-selection filters 14a-14d are for example, 300-500 nm, 500-700 nm, 700-900 nm and 900-1200 nm, light-quantity within the wavelength bands of 300-1200 nm can be freely and minutely adjusted to exit a light with an arbitrary spectral distribution. If the number of the light transmission paths and the number of the optical fiber bundles (the number of branching) are increased than four, a more detailed wavelength adjustment can be expected.

Figure 3:
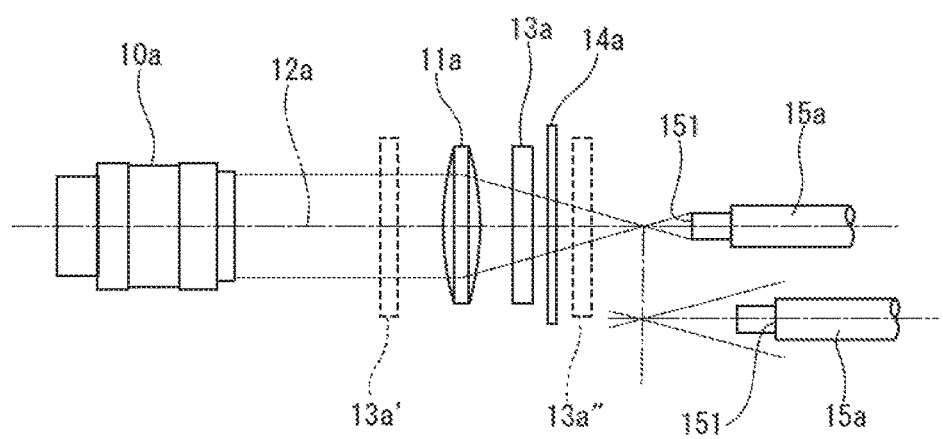
FIG. 3 is a view schematically illustrating an example of each dimming mechanism in the light irradiation apparatus shown in FIG. 1.

FIG. 3 schematically illustrates an example of each dimming mechanism in the light irradiation apparatus in this embodiment. It should be noted that the following discussion describes the dimming mechanism in the optical path corresponding to the optical fiber bundle 15a, but dimming mechanisms of the similar constitution are provide in the optical paths corresponding to the other optical fiber bundles 15b-15d.

As shown in the figure, the dimming mechanism of this embodiment is configured to mechanically displace the light incidence end 151 of the optical fiber bundle 15a along the optical axis in parallel to adjust (reduce) light-quantity. That is, by displacing the light incidence end 151, adjusted is a ratio of area of the concentrated light entered into the light incidence end 151 of the optical fiber bundle 15a and thus its light-quantity can be adjusted. The convex lens element 11a, the shutter mechanism 13a and the wavelength-selection filter 14a are fixed at the static position, and are not moved. For example, the dimming mechanism will be constructed as follows. First, provided are an optical bench carrier (not shown), and an optical bench (not shown) engaged with the optical bench carrier, capable of displacing along the optical axis. Then, the optical fiber bundle 15a is clamped to the provided optical bench so that the light incidence end 151 of this optical fiber bundle 15a is possible to be displaced by sliding along the optical axis 12a. The optical bench may be a thin optical bench made of, for example, of an aluminum material. As for this optical bench, an aluminum optical bench OBT-500LH of SIGMAKOKI CO., LTD. may be adopted for example. The optical bench carrier may be a carrier mounted on the optical bench to be displaced by sliding along the optical axis 12a and made of, for example, of an aluminum material. As for this optical bench carrier, an aluminum optical bench carrier CAA-120L of SIGMAKOKI CO., LTD. may be adopted for example. In a modification, a clamp knob for locking the sliding movement of the optical bench carrier may be provided.

As shown in FIG. 3, the parallel light emitted from the light source 10a is concentrated by the convex lens element 11a and is incident on the light incidence end 151 of the optical fiber bundle 15a through the shutter mechanism 13a and the wavelength-selection filter 14a. In this case, the light-quantity of the light being incident on the light incidence end 151 is adjusted or reduced by the sliding movement of the light incidence end 151 along optical axis 12a.

Although the shutter mechanism 13a is inserted between the convex lens element 11a and the wavelength-selection filter 14a in the above-mentioned embodiment, in a modifications, a shutter mechanism 13a' may be inserted between the light source 10a and the convex lens element 11a, or a shutter mechanism 13a" may be inserted between the wavelength-selection filter 14a and the optical fiber bundle 15a, as shown by the broken lines in FIG. 3.

The optical fibers in the optical fiber path 15 are made of quartz glass optical fibers having an extremely high optical transmissivity. As aforementioned, the four optical fiber bundles 15a-15d of the optical fiber path 15 constitute the four independent light incident ends 151-154 at the incident end, respectively, and the single light exit end at the exit end by combining the lot of optical fibers of the four optical fiber bundles 15a-15d. These many optical fibers of the four optical fiber bundles 15a-15d are dispersedly arranged with each other in uniform at the single light exit end 155.

Figure 4:
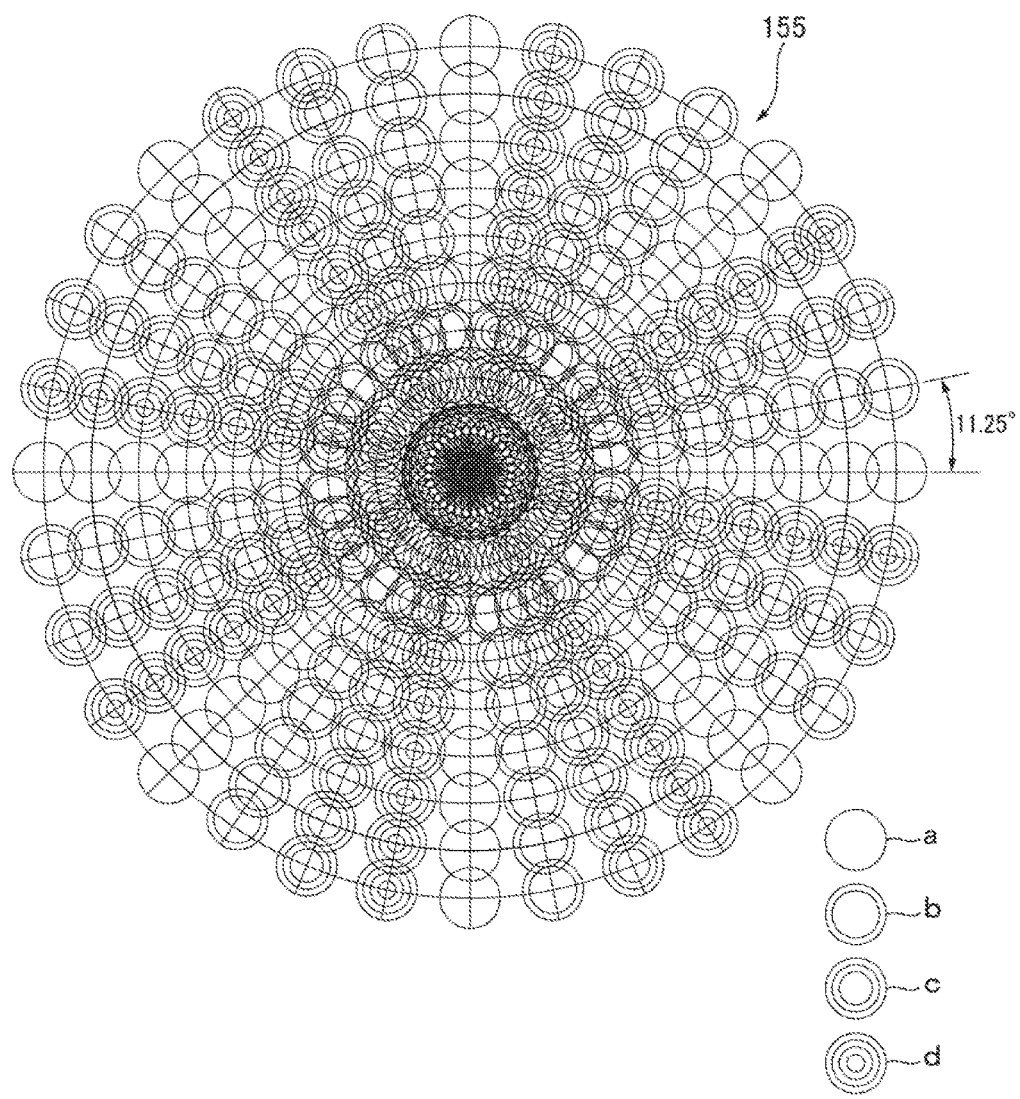
FIG. 4 is a view illustrating an example of arrangement of a lot of optical fibers at a light exit end of an optical fiber path of the light irradiation apparatus shown in FIG. 1.

FIG. 4 illustrates an example of arrangement of the lot of optical fibers at the light exit end 155 of the optical fiber path 15 of the light irradiation apparatus of this embodiment as a section view seen from the optical axis direction. In the figure, references a-d show optical fibers included in the optical fiber bundles 15a-15d, respectively.

As will be seen from the figure, the many optical fibers constituting the four optical fiber bundles 15a-15d are radially arranged for each optical fiber bundle at the light exit end 155 so that they are dispersedly arranged with each other in uniform. In this example, the optical fibers for each optical fiber bundle are radially arranged with an angular interval of 11.25 degrees between the optical fiber bundles. Namely, the optical fiber a of the optical fiber bundle 15a and the optical fiber b of the optical fiber bundle 15b for example are arranged radially with an angular interval of 11.25 degrees there between. Thus, the lights entered into the light incidence ends 151-154 of the four optical fiber bundles 15a-15d are emitted from the single light exit end 155 in uniform distribution with each other.

Figure 5:
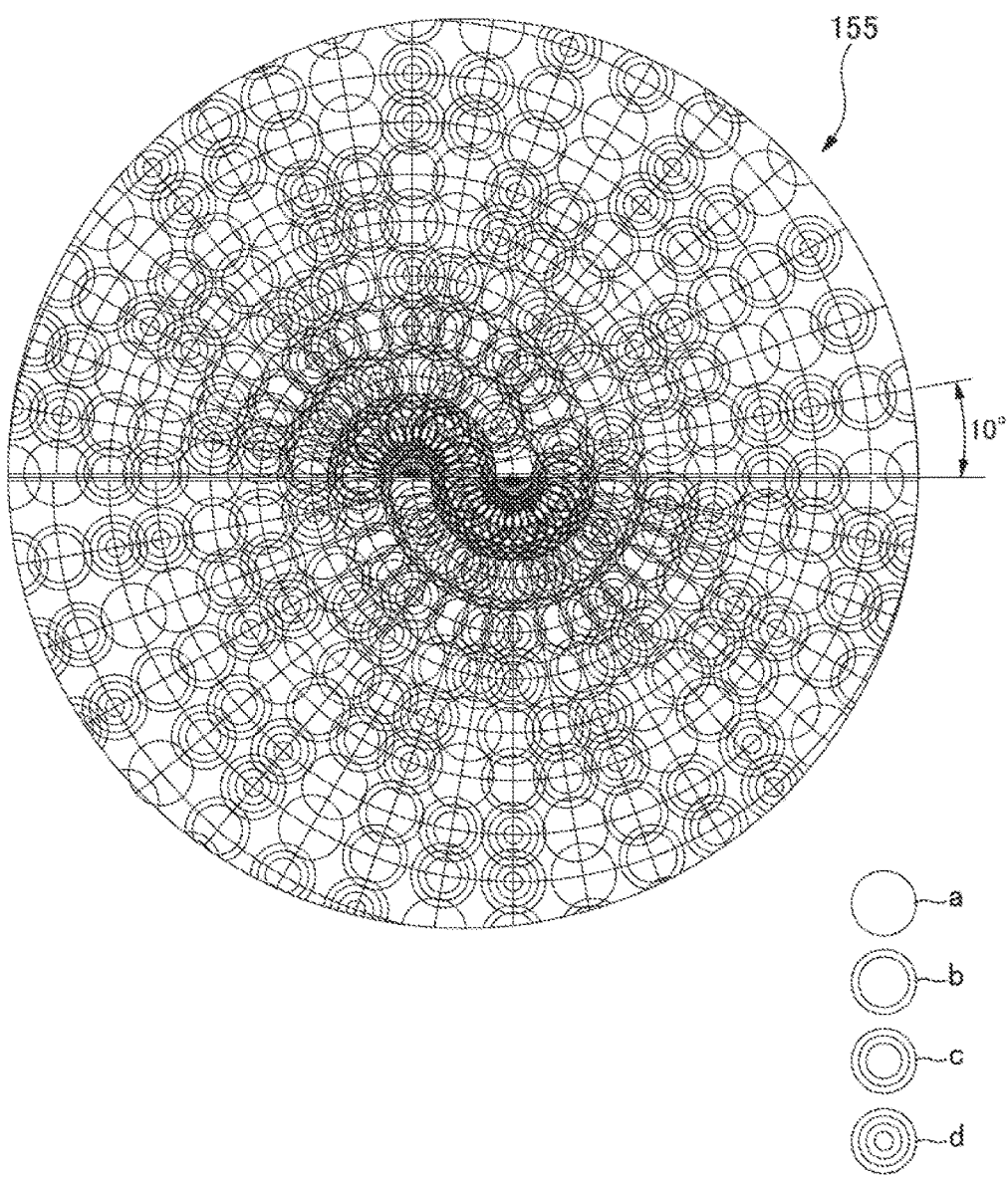
FIG. 5 is a view illustrating another example of arrangement of a lot of optical fibers at a light exit end of an optical fiber path of the light irradiation apparatus shown in FIG. 1.

FIG. 5 illustrates another example of arrangement of the lot of optical fibers at the light exit end 155 of the optical fiber path 15 of the light irradiation apparatus of this embodiment as a section view seen from the optical axis direction. In the figure, references a-d show optical fibers included in the optical fiber bundles 15a-15d, respectively.

As will be seen from the figure, the many optical fibers constituting the four optical fiber bundles 15a-15d are vorticosely or spirally arranged for each optical fiber bundle at the light exit end 155 so that they are dispersedly arranged with each other in uniform. In this example, the optical fibers for each optical fiber bundle are vorticosely arranged with an angular interval of 10.0 degrees between the optical fiber bundles. Namely, the optical fiber a of the optical fiber bundle 15a and the optical fiber b of the optical fiber bundle 15b for example are arranged vorticosely to have an angular interval of 10.0 degrees there between at the circle edge. Thus, the lights entered into the light incidence ends 151-154 of the four optical fiber bundles 15a-15d are emitted from the single light exit end 155 in uniform distribution with each other.

The light emitted from the light exit end 155 of the optical fiber path 15 is concentrated by the convex lens element 16 and the concentrated light is incident on the integrator element 17. The integrator element 17 may be composed of an integrator optical system with a compound-eye lens (fly-eye lens), which is a well-known optical element in this technical field. This integrator optical system generates uniform light distribution by displacing the positions of a lot of optical images formed by a plurality of lenses with each other and by superimposing them.

The collimation lens 18 is a well-known optical element in this technical field for converting an incident light into a parallel beam or a parallel light.

Hereinafter, a light-quantity adjustment in the light irradiation apparatus of this embodiment will be described.

The light-quantity adjustment is performed at first by adjusting the dimming mechanisms of the four light transmission paths so that the respective light-quantities of lights entered into the optical fiber bundles 15a-15d become 10%, 20%, 40% and 60% of the original light-quantity, respectively. That is, it is adjusted that the dimmed ratios of light-quantity are 10% for the optical fiber bundle 15a, 20% for the optical fiber bundle 15b, 40% for the optical fiber bundle 15c, and 60% for the optical fiber bundle 15d. It should be noted that values of the dimmed ratios of the lights entered into these optical fiber bundles 15a-15d are mere examples and may be set other values of course.

Then, the shutter mechanisms 13a-13d are controlled by the control circuit 20, respectively, so as to select lights entered into the respective optical fiber bundles 15a-15d. Thus, the light-quantity of the exit light is adjusted by combining these selected lights together at the light exit end 155 of the optical fiber path 15 to complete light-quantity adjustment. More concretely, this light-quantity adjustment is performed by controlling opening and closing of the shutter mechanisms 13a-13d specifically as follows. In the following description, the amounts of light-quantity adjustment are indicated by illuminances on the light irradiation surface 19. The illuminance 10% corresponds to the light-quantity adjustment of 10% with respect to the original light-quantity (dimmed ratio of light-quantity 10%).

Illuminance 10%: only the light through the optical fiber bundle 15a of 10% light-quantity is passed;

Illuminance 20%: only the light through the optical fiber bundle 15b of 20% light-quantity is passed;

Illuminance 30%: the lights through the optical fiber bundle 15a of 10% light-quantity and the light through the optical fiber bundle 15b of 20% light-quantity are passed;

Illuminance 40%: only the light through the optical fiber bundle 15*c* of 40% light-quantity is passed;

Illuminance 50%: the lights through the optical fiber bundle 15*a* of 10% light-quantity and the light through the optical fiber bundle 15*c* of 40% light-quantity are passed;

Illuminance 60%: only the light through the optical fiber bundle 15*d* of 60% is passed;

Illuminance 70%: the lights through the optical fiber bundle 15*a* of 10% light-quantity, the light through the optical fiber bundle 15*b* of 20% light-quantity and the light through the optical fiber bundle 15*c* of 40% light-quantity are passed;

Illuminance 80%: the lights through the optical fiber bundle 15*b* of 20% light-quantity and the light through the optical fiber bundle 15*d* of 60% light-quantity are passed;

Illuminance 90%: the lights through the optical fiber bundle 15*a* of 10% light-quantity, the light through the optical fiber bundle 15*b* of 20% light-quantity and the light through the optical fiber bundle 15*d* of 60% light-quantity are passed;

Illuminance 100%: the lights through the optical fiber bundle 15*c* of 40% light-quantity and the light through the optical fiber bundle 15*d* of 60% light-quantity are passed; and Illuminance 120%: the lights through the optical fiber bundle 15*b* of 20% light-quantity, the light through the optical fiber bundle 15*c* of 40% light-quantity and the light through the optical fiber bundle 15*d* of 60% light-quantity are passed.

Illuminances at the center point of the light irradiation surface 19 were measured in cases that such light-quantity adjustments were really performed using the light irradiation apparatus shown in FIG. 1, and the measured results and calculated value were compared. The results of these comparisons are shown in Table 1. In this measurement, 300 W CERMAX (Registered Trademark) lamps manufactured by EXCELITAS TECHNOLOGIES CORPORATION were used as for the light sources 10*a*-10*d*, optical filter elements having the same pass band were used as for the wavelength-selection filters 14*a*-14*d*, an integrator with 25 fly-eye lenses each having 3 mm×3 mm square was used as for the integrator element 17, and a collimation lens with F=159 mm and a parallelism of ±4 degrees was used as for the collimation lens element 18. Illuminances were measured by an illuminance meter of thermopile type (MIR-101Q manufactured by SSC CO., LTD.) mounted on the optical axis position of the light irradiation surface 19 having an irradiation area of 40 mm×40 mm square and an effective area of 20 mm×20 mm square. The thermopile type illuminance meter was used for measurement because it is possible to provide a flat-detection property with respect to wavelength. The illuminance meter was calibrated so that 9.5 mV output of this illuminance meter corresponds to illuminance 100%. The errors were calculated from the formula of (Error)=((Measured Amount)−(Calculated Amount))/(Calculated Amount).

TABLE 1

| Illuminance | Measured Amount (mV) | Calculated Amount (mV) | Error (%) |
| --- | --- | --- | --- |
| 10% | 0.95 | 0.95 | 0.00 |
| 20% | 1.9 | 1.9 | 0.00 |
| 30% | 2.86 | 2.85 | 0.35 |
| 40% | 3.80 | 3.80 | 0.00 |
| 50% | 4.76 | 4.75 | 0.16 |

TABLE 1-continued

| Illuminance | Measured Amount (mV) | Calculated Amount (mV) | Error (%) |
| --- | --- | --- | --- |
| 60% | 5.72 | 5.70 | 0.35 |
| 70% | 6.67 | 6.65 | 0.30 |
| 80% | 7.57 | 7.60 | 0.40 |
| 90% | 8.53 | 8.55 | 0.23 |
| 100% | 9.50 | 9.50 | 0.00 |
| 120% | 11.4 | 11.4 | 0.00 |

As will be noted from Table 1, by performing the above-mentioned light-quantity adjustment, the illuminance could be certainly adjusted in a range between 10% and 120% without changing the lamp electric current nor using any mechanical light-quantity adjustment means. Also, in that case, illuminance adjustment was performed, in an error range of within 0.5%.

Figure 6:
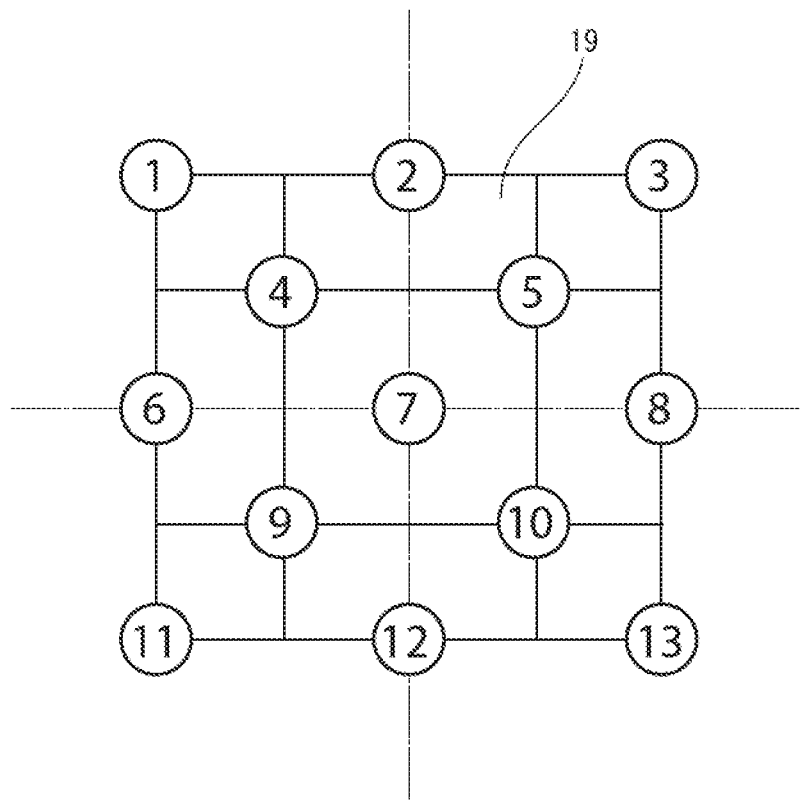
FIG. 6 is a view illustrating illuminance measurement points of an irradiated surface in the light irradiation apparatus shown in FIG. 1.

In plane distributions of illuminances on the light irradiation surface 19 when the light was actually irradiated using the above-mentioned light irradiation apparatus shown in FIG. 1 were measured. The results of these measurements are shown in Table 2. These measurements were done by measuring illuminances on illuminance measurement points 1-13 shown in FIG. 6 of the light irradiation surface 19, respectively, when the light-quantity adjustment of illuminance 60%, illuminance 40%, illuminance 20% and illuminance 10% were performed, respectively. An illuminance meter UIT-101 manufactured by USHIO INC., which is a 436 nm illuminance meter with a light-receiving area of 1 mm φ was used for pinpoint measurement. The other measurement conditions were similar to these in the measurement of Table 1. The variations of in-plane distribution were calculated about the outputs of the illuminance meter from the formula of (Variation)=((Maximum Value)−(Minimum Value))/((Maximum Value)+(Minimum Value)).

TABLE 2

| Measured Point | Illuminance 60% (mV) | Illminance 40% (mV) | Illuminance 20% (mV) | Illuminance 10% (mV) |
| --- | --- | --- | --- | --- |
| 1 | 3.15 | 1.77 | 0.83 | 0.35 |
| 2 | 3.18 | 1.80 | 0.85 | 0.36 |
| 3 | 3.21 | 1.80 | 0.85 | 0.36 |
| 4 | 3.15 | 1.77 | 0.82 | 0.35 |
| 5 | 3.25 | 1.82 | 0.84 | 0.35 |
| 6 | 3.25 | 1.82 | 0.84 | 0.35 |
| 7 | 3.18 | 1.78 | 0.80 | 0.34 |
| 8 | 3.25 | 1.80 | 0.83 | 0.35 |
| 9 | 3.20 | 1.80 | 0.83 | 0.35 |
| 10 | 3.20 | 1.80 | 0.82 | 0.35 |
| 11 | 3.25 | 1.82 | 0.84 | 0.36 |
| 12 | 3.20 | 1.80 | 0.82 | 0.35 |
| 13 | 3.25 | 1.82 | 0.82 | 0.35 |
| Variation In In-plane Distribution | ±1.56% | ±1.39% | ±3.00% | ±2.85% |

As will be seen from Table 2, the in-plane distribution of ±3.00% or less was obtained by performing the light irradiation using the above-mentioned optical fiber path 15. Thus, although it might be necessary to perform fine adjustment of the optical axis, good uniformity of in-plane illuminances on the light irradiation surface 19 was kept to approximately satisfy the requirements.

Next, adjustment of the spectral distribution of the light irradiation apparatus of this embodiment will be described.

The adjustment of the spectral distribution will be done by adjusting, using the four dimming mechanisms, light-quantities of lights with different wavelength ranges such as for example 300-500 nm, 500-700 nm, 700-900 nm and 900-1200 nm, passed through the four wavelength-selection filters 14a-14d, respectively, and by controlling passing and blocking of the lights with these different wavelength ranges, using the four shutter mechanisms 13a-13d. As a result, light-quantities of lights in the wavelength range of 300-1200 nm can be freely and minutely adjusted, and therefore the finally provided spectral distribution of the light can be arbitrarily adjusted.

As above-described in detail, according to this embodiment, lights from the light sources 10a-10d transmitted through the four convex lens elements 11a-11d, the four wavelength-selection filters 14a-14d for passing lights with different wavelength ranges each other and the dimming mechanisms are selected by the four shutter mechanisms 13a-13d. Then, the selected lights are incidence on the four optical fiber bundles 15a-15d through the four light incidence ends 151-154, and are exited from the single light exit end 155 after combined together at the exit end. As a result, it is possible to adjust step-by-step the light-quantity of light and to increase the degree of the light-quantity adjustment if the lights from light sources 10a-10d are appropriately selected in the light transmission path and combined together. Also, because the light-quantity is adjusted without using the mechanical light-quantity adjustment means, no change of the spectral distribution occurs at the time of the light-quantity adjustment at all. Furthermore, because the light-quantity is adjusted by appropriately selecting lights from the light sources 10a-10d, not by changing the lamp current, it is possible to utilize the light just after the light-quantity adjustment.

Even more particularly, according to this embodiment, because a lot of optical fibers constituting the four optical fiber bundles 15a-15d are dispersedly arranged with each other in uniform at the single light exit end 154, the lights that are incident on each of the optical fiber bundles 15a-15d are emitted in uniform distribution, and the uniformity of the light intensity distribution can be well maintained even during the light-quantity adjustment. Also, because the light from the light exit end 151 of the optical fiber path 15 is concentrated by the convex lens element 16 and the concentrated light is incident on the integrator element 17 to distribute optically in uniform, and thereafter the uniform light is converted into parallel light by the collimation lens element 18, it is possible to obtain a parallel light beam with a uniform light intensity.

Furthermore, according to this embodiment, since a lot of optical fibers constituting the four optical fiber bundles 15a-15d are dispersedly arranged with each other in uniform at the single light exit end 154, a uniformity of an in-plane light spectral distribution on the light irradiation surface 19 can be obtained even if the spectral distribution is adjusted by applying lights with different wavelength ranges with each other to the four light incidence ends 151-154 of the optical fiber path 15.

Figure 7:
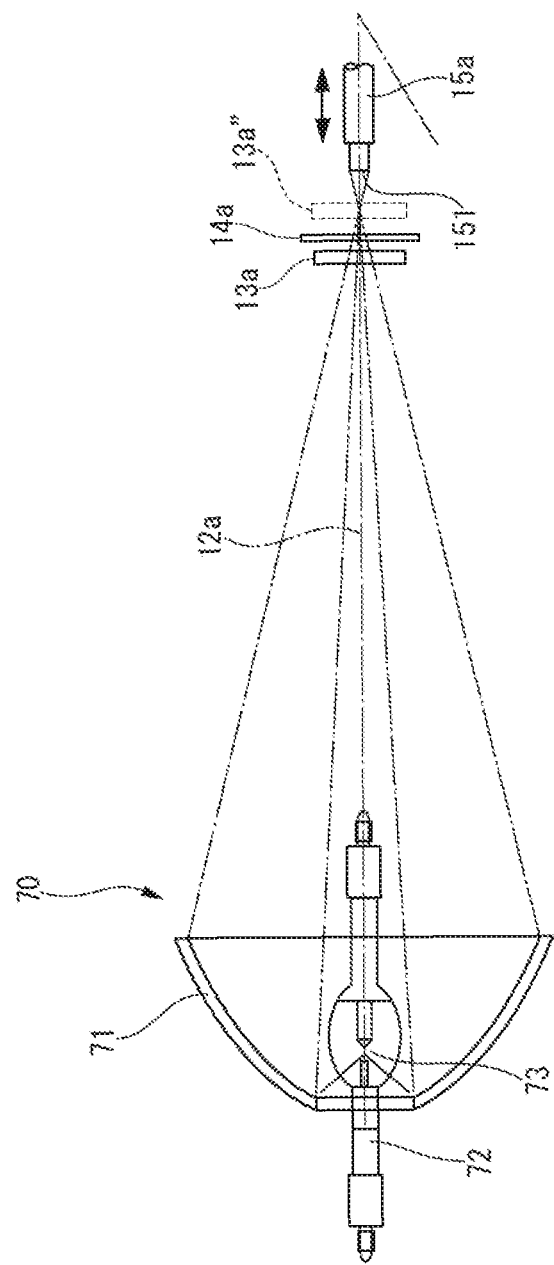
FIG. 7 is a view schematically illustrating structure of a light source and a light transmission path in another embodiment of a light irradiation apparatus according to the present invention.

FIG. 7 schematically illustrates the structure of a light source and a light transmission path in another embodiment of a light irradiation apparatus according to the present invention. In this embodiment, each light source is configured from an integral lamp unit 70 shown in this figure. It should be noted that the following discussion describes a light source and a light transmission path in the optical path corresponding to the optical fiber bundle 15a, but light sources and light transmission paths of the similar constitution are provide in the optical paths corresponding to the other optical fiber bundles 15b-15d, respectively.

The lamp unit 70 is configured from a reflecting mirror 71 having an inner surface with an ellipsoidal axial section and a short-arc xenon lamp 72 incorporated with the reflecting mirror 71 so that a light emission point 73 of the short-arc xenon lamp 72 is located at the focus of the reflecting mirror 71.

Since the light emission point 73 is located at the ellipsoid focus of the reflecting mirror 71, the light reflected by this reflecting mirror 71 and emitted to the front side becomes a concentrated light travelling along the optical axis 12a. Thus, in this embodiment, unnecessary convex lens element for concentrating the light from the light source is not provided, but a shutter mechanism 13a for passing or blocking the concentrated light from the light unit 70 and a wavelength-selection filter 14a are provided on the optical axis 12a just before the light incidence end 151 of the optical fiber bundle 15a.

It should be noted that although the shutter mechanism 13a is provide between the lamp unit 70 and the wavelength-selection filter 14a in the above-mentioned explanation, in modification, a shutter mechanism 13a'' may be provided between the wavelength-selection filter 14a and the optical fiber bundle 15a as shown by a broken line in FIG. 7.

Other constitutions, functions and effects in this embodiment are the same as these in the embodiment of FIG. 1 except for the light source and the light transmission path.

Figure 8:
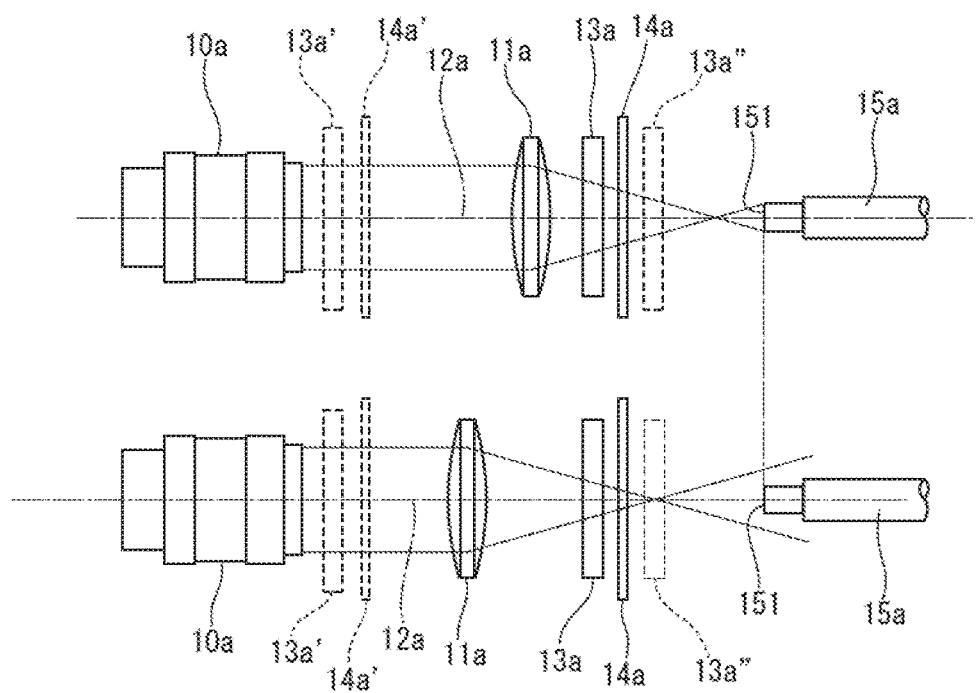
FIG. 8 is a view schematically illustrating an example of each dimming mechanism in further embodiment of a light irradiation apparatus according to the present invention.

FIG. 8 schematically illustrates the structure of each dimming mechanism in further embodiment of a light irradiation apparatus according to the present invention. In this embodiment, translation mechanisms (not shown) for mechanically displacing the four convex lens elements 11a-11d along their optical axes in parallel are provided, respectively, so as to configure dimming mechanisms (corresponding to the dimming means of the present invention) for adjusting light-quantities incident on the four light incident ends 151-154 of the four optical fiber bundles 15a-15d to, respectively. In the case shown in FIG. 8, the dimming mechanism displaces the convex lens element 11a along the optical axis 12a in parallel to adjust the light-quantity incident on the light incident end 151 of the optical fiber bundle 15a. The shutter mechanism 13a, the wavelength-selection filter 14a and the optical fiber bundle 15a are not displaced but fixed to the static position. It should be noted that the following discussion describes the dimming mechanism in the optical path corresponding to the optical fiber bundle 15a, but dimming mechanisms of the similar constitution are provide in the optical paths corresponding to the other optical fiber bundles 15b-15d.

As shown in the figure, the dimming mechanism of the this embodiment is configured to mechanically displace the convex lens element 11a along the optical axis in parallel to adjust a ratio of area of the concentrated light entered into the light incidence end 151 of the optical fiber bundle 15a and thus its light-quantity is adjusted. For example, the dimming mechanism may be constituted as follows. First, an optical bench carrier (not shown) and an optical bench (not shown) being engaged with the optical bench carrier and capable of displacing along the optical axis are provided. Then, the convex lens element 11a is clamped to the provided optical bench so that this convex lens element 11a is possible to be displaced by sliding along the optical axis 12a. The optical bench may be a thin optical bench made of, for example, an aluminum material. As for this optical bench, an aluminum optical bench OBT-500LH of SIGMA-KOKI CO., LTD. may be adopted for example. The optical bench carrier may be a carrier mounted on the optical bench to be displaced by sliding along the optical axis 12a and made of, for example, of an aluminum material. As for this optical bench carrier, an aluminum optical bench carrier CAA-120L of SIGMAKOKI CO., LTD. may be adopted for example. In a modification, a clamp knob for locking the sliding movement of the optical bench carrier may be provided.

As shown in FIG. 8, the parallel light emitted from the light source 10a is concentrated by the convex lens element 11a and is incident on the light incidence end 151 of the optical fiber bundle 15a through the shutter mechanism 13a and the wavelength-selection filter 14a. In this case, the light-quantity of the light being incident on the light incidence end 151 is adjusted or reduced by the sliding movement of the convex lens element 11a along optical axis 12a.

Although the shutter mechanism 13a is inserted between the convex lens element 11a and the wavelength-selection filter 14a in the above-mentioned embodiment, in a modifications, a shutter mechanism 13a" may be inserted between the wavelength-selection filter 14a and the optical fiber bundle 15a, or a shutter mechanism 13a' and a wavelength-selection filter 14a' may be inserted between the light source 10a and the convex lens element 11a, as shown by the broken line in FIG. 8.

Other constitutions, functions and effects in this embodiment are the same as these in the embodiment of FIG. 1 except for the dimming mechanism.

Figure 9B:
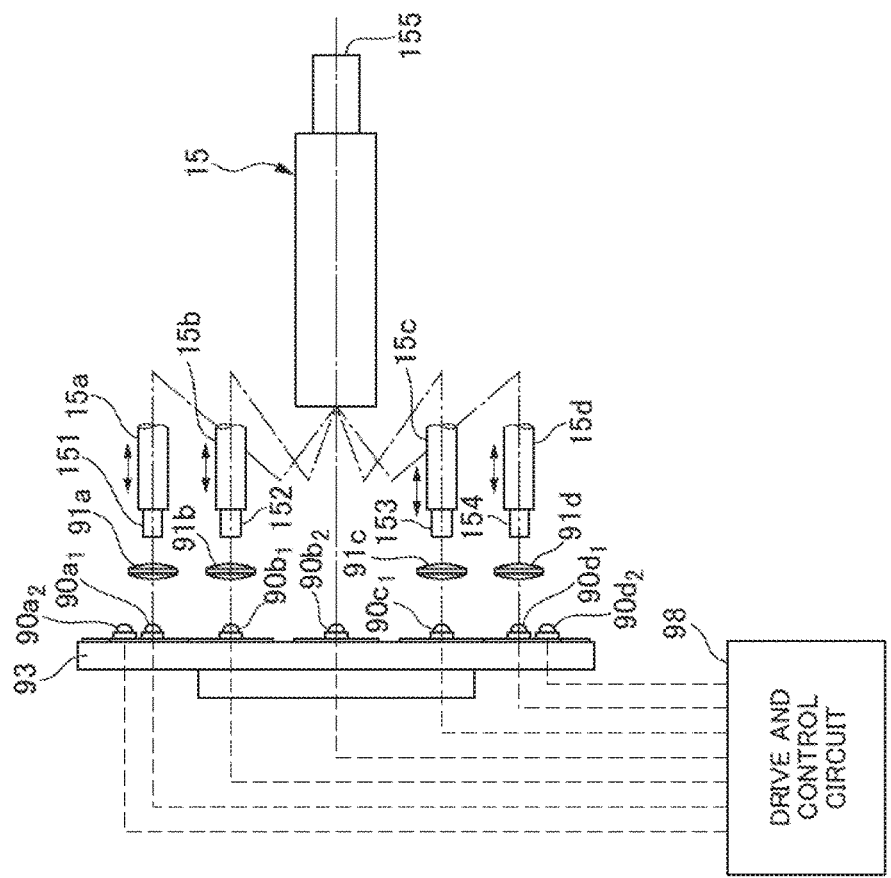
FIG. 9A and FIG. 9B are views schematically illustrating structure of light sources and light transmission paths in still further embodiment of a light irradiation apparatus according to the present invention.
Figure 9A:
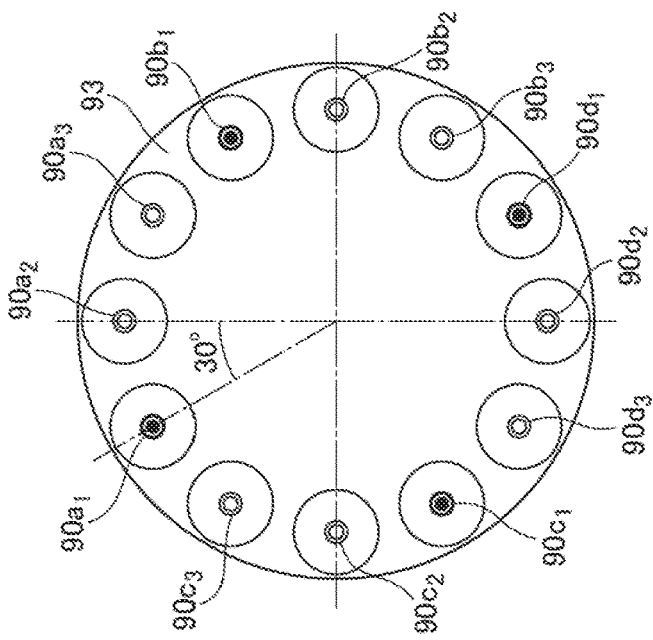
Figure 10:
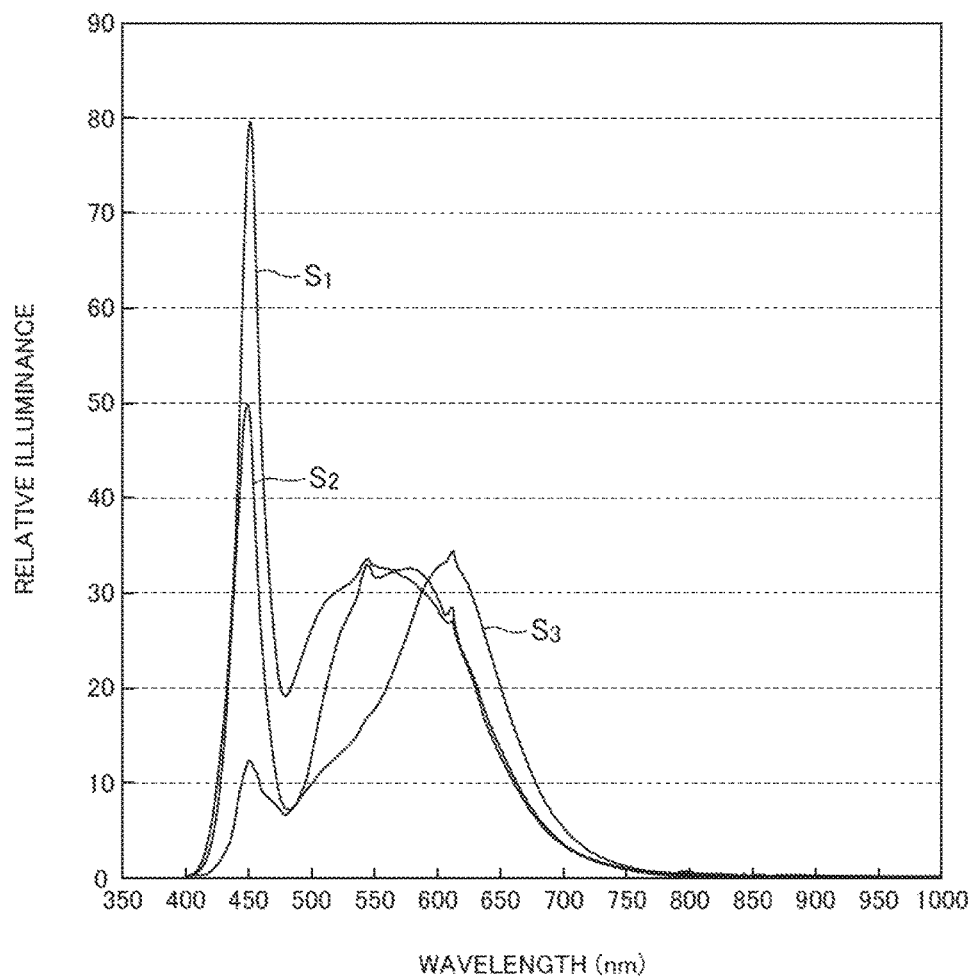
FIG. 10 is a graph schematically illustrating a spectral distribution of light emitted from each light source in the light irradiation apparatus shown in FIG. 9A and FIG. 9B.

FIG. 9A and FIG. 9B schematically illustrate the structure of light sources and light transmission paths in still further embodiment of a light irradiation apparatus according to the present invention. In these figure, FIG. 9A indicates the structure of the light sources seen from the optical axis direction, and FIG. 9B indicates the structure of the light transmission paths seen from the perpendicular direction with respect to the optical axis. FIG. 10 schematically illustrates a spectral distribution of light emitted from each light source in the light irradiation apparatus shown in FIG. 9A and FIG. 9B. Four independent light sources are constituted by four LED reflector units such as LED reflector units $90a_1$-$90d_1$ for example, selected from twelve LED reflector units $90a_1$-$90d_3$. Also, in this embodiment, four convex lens elements $91a$-$91d$ for concentrating the parallel lights emitted from the LED reflector units $90a_1$-$90d_1$ along the optical axes, respectively, are provided, but no shutter mechanism and no wavelength-selection filter are provided because their functions can be achieved by selecting the LED reflector units. Since the constitutions of the optical fiber path 15 and optical systems located downstream of this optical fiber path 15 in this embodiment are the same as these in the embodiment of FIG. 1, detailed description is omitted.

As shown in FIG. 9A, the light sources of this embodiment are constituted by twelve LED reflector units $90a_1$-$90d_3$ attached onto a rotatable support plate 93 at predetermined angular positions with an angular interval of 30 degrees along a circumference direction. Each of these LED reflector units $90a_1$-$90d_3$ is a LED light source configured by combining a high-power LED element, a paraboloid reflecting mirror, an LED lens holder and an LED connector together, such as for example a power LED reflector kit commercially available from AKIZUKI DENSHI TSUSHO CO., LTD. As shown in FIG. 9B, the LED reflector units $90a_1$-$90d_3$ are connected to a drive and control circuit 98, and each ON/OFF of light emitting and each light intensity are selectively controlled depending upon a driving current supplied from the drive and control circuit 98.

The LED reflector units $90a_1$-$90d_3$ of this embodiment are configured by the LED reflector units $90a_1$-$90d_1$, $90a_2$-$90d_2$ and $90a_3$-$90d_3$ of different-color LED elements emitting three kinds of lights having different spectral distributions with each other, and the LED reflector units of each kind are located on the support plate 93 with an angular interval of 90 degrees as shown in FIG. 9A.

The support plate 93 is configured so that it can rotate every predetermined angle (30 degrees in this embodiment) around its center as a rotation axis. More concretely, the support plate 93 is configured to rotate with every 30 degrees by means of a stepping motor (not shown). A rotary encoder (not shown) may be attached to this rotation axis in order to control the rotation angle of the support plate 93 more precisely.

As shown in FIG. 10, the LED reflector units $90a_1$-$90d_1$ emit the light $S_1$ with a spectral distribution called as daylight color, the LED reflector units $90a_2$-$90d_2$ emit the light with a spectral distribution $S_2$ called as neutral white color, and the LED reflector units $90a_3$-$90d_3$ emit the light $S_3$ with a spectral distribution called as light-bulb color.

When the support plate 93 is driven by the stepping motor (not shown) to rotate and then stopped at the position shown in FIG. 9A and FIG. 9B, the parallel lights of the daylight color emitted from the LED reflector units $90a_1$-$90d_1$ and traveled along the optical axes $92a$-$92d$ are concentrated by the convex lens elements $91a$-$91d$, respectively, and are incident on the respective light incidence ends 151-152 of the optical fiber bundles $15a$-$15d$.

Similar to that in the embodiment of FIG. 1, the dimming mechanisms of this embodiment are configured to mechanically displace the light incidence ends 151-154 of the optical fiber bundles $15a$-$15d$ along these optical axes in parallel to adjust ratios of areas of the concentrated lights entered into the respective light incidence ends 151-154 so as to adjust (reduce) light-quantity. Also, in this embodiment, light-quantity adjustment (dimming) can be performed by controlling driving currents supplied from the control circuit 98 to the respective LED reflector units $90a_1$-$90d_3$. In this embodiment, because the LED element is used for each light source, dimming control in a range of 25-100% of the full light-quantity is possible instantly by adjusting the driving current without taking a much time to obtain a stable state and without changing a spectral distribution so much. In fact, when the 25% dimming control is executed, 4-6% of spectral changes may occur in a wavelength band of 400-450 nm but the spectral change may remain in 1-2% in the other wavelength bands. Also, in case of the 50% dimming control, the spectral change may remain within 1% in all wavelength bands. Therefore, according to this embodiment, the spectral change can be ignored if the dimming control by adjusting the driving current is less than 50% of the full light-quantity. As a result, according to this embodiment, the driving currents supplied to the respective LED reflector units $90a_1$-$90d_3$ are controlled as for the dimming control in the range of 50-100% of the full light-quantity, and the dimming mechanisms configured to mechanically displace the light incidence ends 151-154 of the optical fiber bundles $15a$-$15d$ along these optical axes in parallel are used as for the dimming control less than 50% of the full light-quantity. In this embodiment, a dimming mechanism shown in FIG. 8 may be used. Also, as for a dimming mechanism, a ND (Neutral Density) filter capable of continuously changing a light-quantity may be used.

Even more particularly, according to this embodiment, because irradiation and interception of light from the LED reflector units $90a_1$-$90d_3$ can be performed instantly by ON/OFF controlling the driving currents supplied from the control circuit 98, no shutter mechanism is necessary resulting simple and low cost constitutions of the light irradiation apparatus.

Furthermore, according to this embodiment, since the light sources are configured by LED elements, the temperature of the light sources and their peripheral elements will not rise high. Therefore, it is not necessary to use expensive quartz glass fibers for the optical fiber bundles but cheap general glass fibers may be used resulting that a cheap light irradiation apparatus can be provided.

In this embodiment, when the support plate 93 is rotated by 30 degrees in the counterclockwise direction in FIG. 9A, the parallel lights of the neutral white color emitted from the LED reflector units 90$a_2$-90$d_2$ and traveled along the optical axes 92$a$-92$d$ are concentrated by the convex lens elements 91$a$-91$d$, respectively, and are incident on the respective light incidence ends 151-152 of the optical fiber bundles 15$a$-15$d$. Then, when the support plate 93 is further rotated by 30 degrees in the counterclockwise direction, the parallel lights of the light-bulb color emitted from the LED reflector units 90$a_3$-90$d_3$ and traveled along the optical axes 92$a$-92$d$ are concentrated by the convex lens elements 91$a$-91$d$, respectively, and are incident on the respective light incidence ends 151-152 of the optical fiber bundles 15$a$-15$d$. Since LED elements with a small dimension are used as light sources, according to this embodiment, a plurality of different colored LED reflector units with different spectral distributions can be mounted on this support plate. Then, by selecting one LED reflector unit from the plurality of different colored LED reflector units on the support plate, one colored light can be optionally emitted. Further, a light with a desired spectral distribution may be obtained if the lights from the plurality of different colored LED reflector units with different spectral distributions mounted on the support plate 93 are appropriately combined and mixed. That is, although it is not shown in the figure, if the mounting positions of these different colored LED reflector units on the support plate 93 are arranged such that for example the LED reflector units 90$a_1$ are positioned on the optical axis 92$a$, the LED reflector units 90$a_2$ are positioned on the optical axis 92$b$, and the LED reflector units 90$a_3$ are positioned on the optical axis 92$c$ in one rotation position of the support plate 93, and desired lights from these LED reflector units are selectively combined and mixed, the desired spectral distribution light can be obtained.

Other constitutions, functions and effects in this embodiment are the same as these in the embodiment of FIG. 1.

In the aforementioned embodiment of FIG. 9A and FIG. 9B, the light incidence ends of the four optical fiber bundles are arranged to have the equal angular interval (90 degrees interval) in the circumference direction (four blanches), and the LED reflector units with three colored spectral distributions are arranged to have the equal angular interval (30 degrees interval) in the circumference direction and to face these light incidence ends of the optical fiber bundles. However, in modifications, LED reflector units with a different number (different from three) of color spectral distributions may be arranged to face the light incidence ends of the optical fiber bundles. Although it is a mere example, LED reflector units with five color spectral distributions may be arranged to have the equal angular interval (18 degrees interval) in the circumference direction to face the light incidence ends of the four optical fiber bundles. Also, light incidence ends of three optical fiber bundles may be arranged to have the equal angular interval (120 degrees interval) in the circumference direction (three blanches), and LED reflector units with four color spectral distributions may be arranged to have the equal angular interval (30 degrees interval) in the circumference direction and to face the light incidence ends of the optical fiber bundles. Further, light incidence ends of six optical fiber bundles may be arranged to have the equal angular interval (60 degrees interval) in the circumference direction (six blanches), and LED reflector units with two color spectral distributions may be arranged to have the equal angular interval (30 degrees interval) in the circumference direction and to face the light incidence ends of the optical fiber bundles. It should be noted that any number of blanches and any number of color lights may be optionally combined in the light irradiation apparatus according to the present invention.

Furthermore, instead of the LED elements, it is possible to use organic or inorganic electroluminescence light emission elements as light emission sources of the LED reflector unit.

Many widely different embodiments of the present invention may be constructed without departing from the spirit and scope of the present invention. It should be understood that the present invention is not limited to the specific embodiments described in the specification, except as defined in the appended claims.

The present invention can be adopted to various light irradiation apparatuses and optical fiber paths in solar simulators and other optical devices.

The invention claimed is:

1. A light irradiation apparatus comprising:
   a plurality of light sources;
   a plurality of light transmission paths capable of selectively transmitting lights from the plurality of light sources, respectively;
   an optical fiber path provided with a plurality of light incidence ends receiving respective lights from the plurality of light transmission paths, and a single light exit end; and
   a dimming means capable of dimming lights that are incident on the plurality of light incidence ends, respectively,
   the optical fiber path having a plurality of optical fiber bundles, incidence ends of the plurality of optical fiber bundles configuring the plurality of light incidence ends, and exit ends of the plurality of optical fiber bundles configuring the single light exit end by combining themselves;
   a lot of optical fibers constituting the plurality of optical fiber bundles, the optical fibers of the plurality of optical fiber bundles being dispersedly arranged with each other in uniform at the single light exit end,
   each of the dimming means comprises a translation mechanism for mechanically displacing, along an optical axis in parallel, a third optical element for concentrating parallel light from the light source to be incident on the light incidence end of the optical fiber path.

2. The light irradiation apparatus as claimed in claim 1, wherein the optical fibers are radially arranged for each of the plurality of optical fiber bundles at the single light exit end so that the optical fibers are dispersedly arranged in uniform.

3. The light irradiation apparatus as claimed in claim 1, wherein the optical fibers are vorticosely arranged for each of the plurality of optical fiber bundles at the single light exit end so that the optical fibers are dispersedly arranged in uniform.

4. The light irradiation apparatus as claimed in claim 1, wherein the apparatus further comprises a first optical element for concentrating light from the optical fiber path, an integrator element for distributing the light from the first optical element optically in uniform, and a second optical element for converting the light from the integrator element into parallel light.

5. The light irradiation apparatus as claimed in claim 1, wherein each of the plurality of light transmission paths comprises a shutter means capable of selectively blocking light transmitted through the light transmission path.

6. The light irradiation apparatus as claimed in claim 5, wherein the apparatus further comprises a control means for controlling intensity of lights emitted from the plurality of light transmission paths by controlling shuttering operation of a plurality of the shutter means in the plurality of light transmission paths, respectively.

7. The light irradiation apparatus as claimed in claim 1, wherein each of the plurality of light transmission paths comprises a spectral distribution defining means for defining spectral distribution of light transmitted through the light transmission path.

8. The light irradiation apparatus as claimed in claim 7, wherein the spectral distribution defining means consists of an optical filter element.

9. The light irradiation apparatus as claimed in claim 1, wherein the plurality of light sources are configured by a plurality of gas discharge lamps, respectively.

10. The light irradiation apparatus as claimed in claim 1, wherein the plurality of light sources are configured by a plurality of solid light-emitting elements, respectively.

11. The light irradiation apparatus as claimed in claim 10, wherein current provided to each of the plurality of solid light-emitting elements is adjusted so as to control intensity of light that is incident on each of the plurality of light incidence ends of the optical fiber path.

12. The light irradiation apparatus as claimed in claim 10, wherein the plurality of solid light-emitting elements include different colored solid light-emitting elements for emitting different color lights having different spectral distributions with each other, and wherein spectral distribution of light emitted from the optical fiber path is controlled by selectively entering light emitted from one of the different colored solid light-emitting elements onto the plurality of light incidence ends of the optical fiber path.

13. The light irradiation apparatus as claimed in claim 10, wherein the plurality of solid light-emitting elements include different colored solid light-emitting elements for emitting different color lights having different spectral distributions with each other, and wherein spectral distribution of light emitted from the optical fiber path is controlled by emitting lights from selectively combined different colored solid light-emitting elements.

* * * * *